United States Patent [19]

Shields

[11] 4,388,797
[45] Jun. 21, 1983

[54] BANDING MACHINE

[76] Inventor: Walter A. Shields, 181-41 Henley Rd., Jamaica, N.Y. 11432

[21] Appl. No.: 203,085

[22] Filed: Nov. 3, 1980

[51] Int. Cl.³ .................. B23B 5/14; B65B 11/18; B65G 25/10
[52] U.S. Cl. ........................ 53/585; 53/202; 53/292; 53/297; 82/70.2; 198/486; 493/290
[58] Field of Search .............. 53/585, 202, 291–293, 53/567, 295–298; 493/290; 83/187, 175, 176; 82/70.2, 72, 73, 75–77; 198/445, 491, 486, 621, 740; 156/86

[56] References Cited

U.S. PATENT DOCUMENTS

| | | | |
|---|---|---|---|
| 1,172,151 | 2/1916 | Maltby | 493/290 X |
| 2,585,559 | 2/1952 | Lakso | 198/445 |
| 2,732,115 | 1/1956 | Allen | 53/292 |
| 2,744,610 | 5/1956 | Stiles | 198/491 X |
| 2,751,735 | 6/1956 | Bartlett et al. | 53/292 |
| 3,313,090 | 4/1967 | Kerrigan | 53/291 X |
| 3,531,354 | 9/1970 | Hetzinger et al. | 156/521 X |
| 3,738,210 | 6/1973 | Fujio | 53/292 X |
| 3,760,558 | 9/1973 | Kaminsky et al. | 53/567 |
| 3,888,067 | 6/1975 | Cross et al. | 53/292 |
| 4,064,674 | 12/1977 | Palmer | 53/573 X |
| 4,118,915 | 10/1978 | Swenson | 53/291 |
| 4,179,863 | 12/1979 | Fresnel | 53/295 |
| 4,184,309 | 1/1980 | Amberg | 53/292 X |
| 4,296,590 | 10/1981 | Focke | 198/425 X |

Primary Examiner—John Sipos
Assistant Examiner—Charles L. Willis
Attorney, Agent, or Firm—Jordan and Hamburg

[57] ABSTRACT

A banding machine for continuously forming and applying the bands on articles comprises means for arranging rows of the articles, means for receiving the articles at the front end of the arranging means and transferring the articles to a band receiving position, means for supplying at least one tubular member to be fabricated into a band, and fabricating and positioning means to continuously fabricate bands from the respective tubular member and secure the bands around the articles retained at the band receiving position by the receiving and transferring means.

16 Claims, 14 Drawing Figures

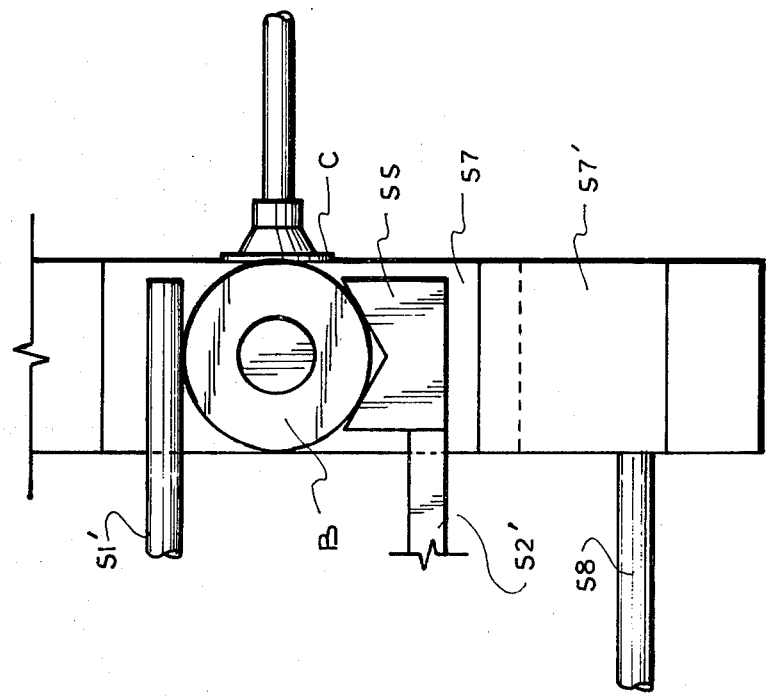
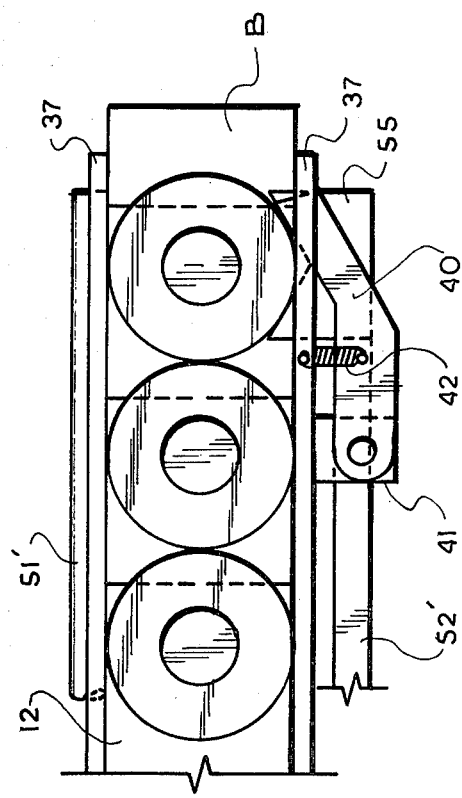

F I G. 11
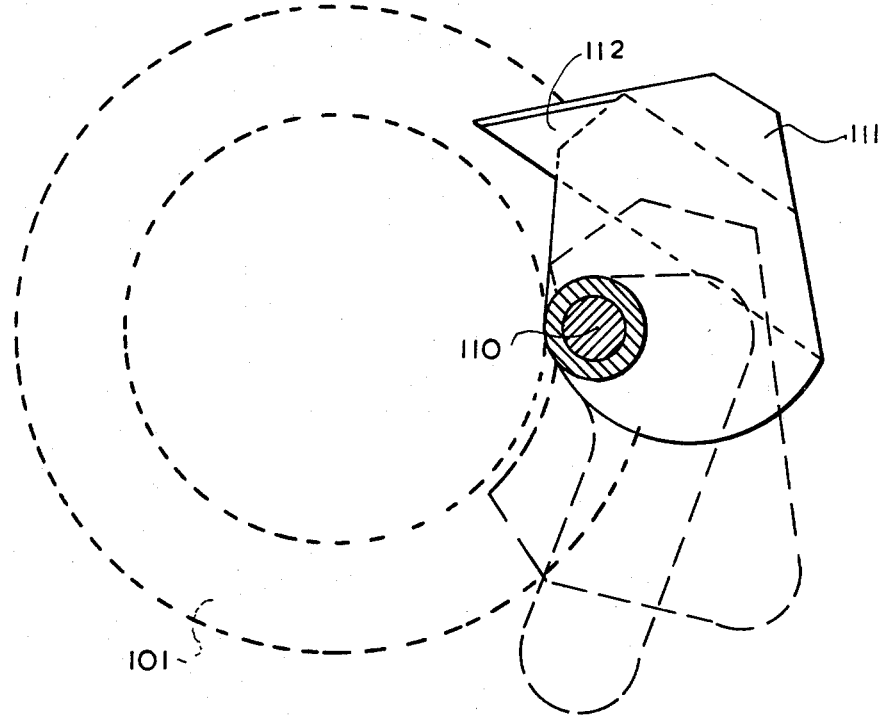

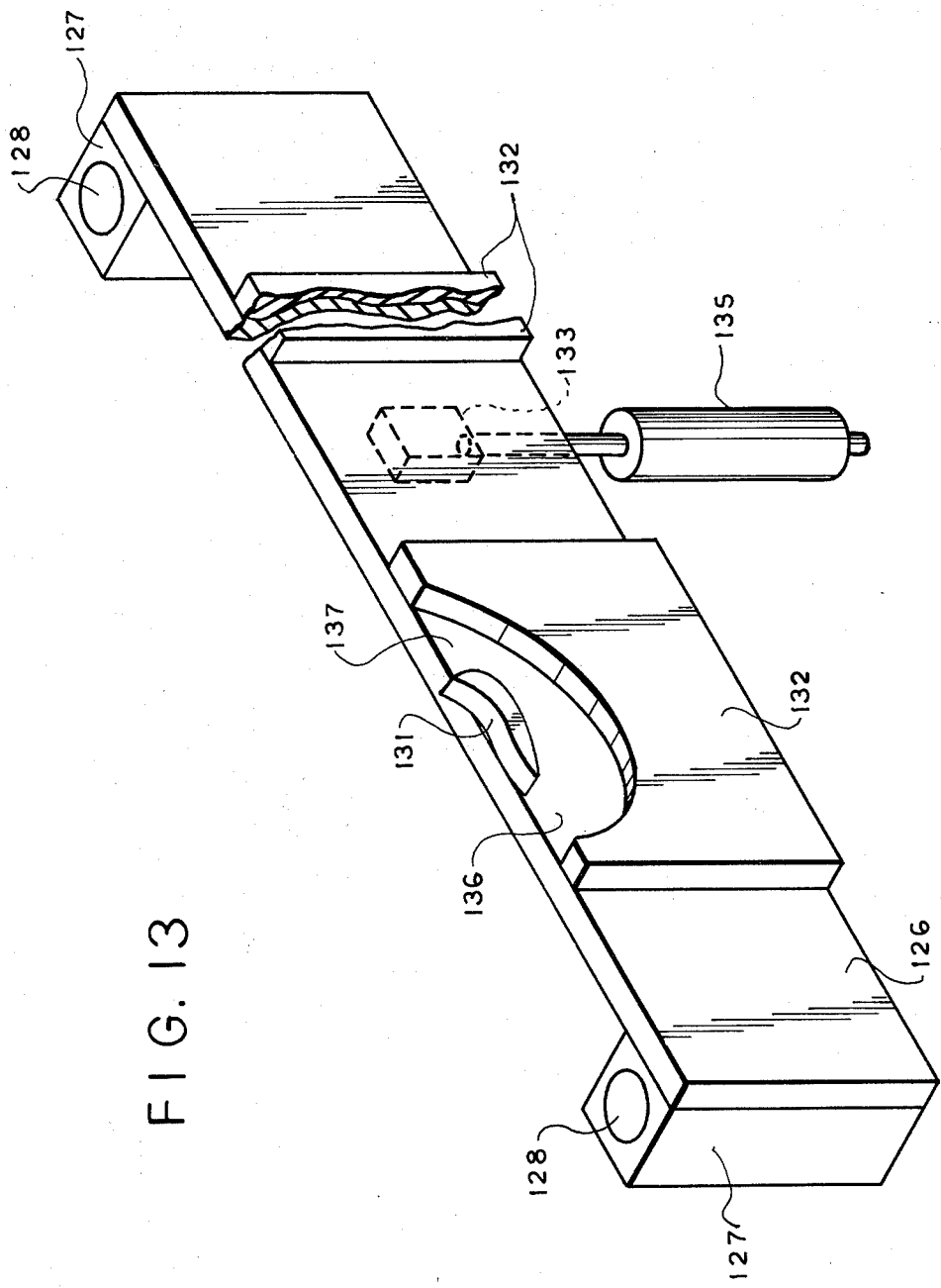

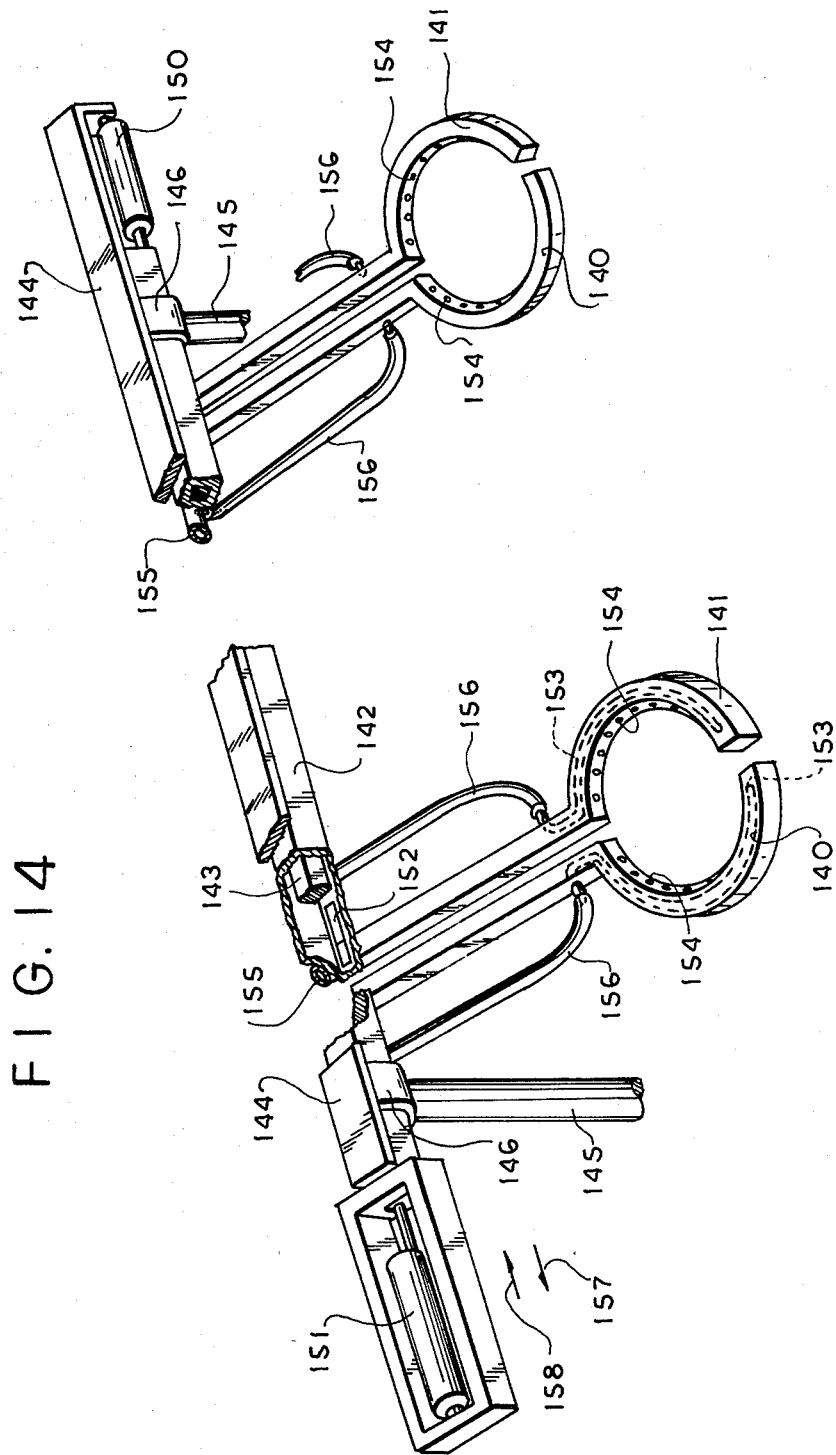

BANDING MACHINE

BACKGROUND OF THE INVENTION

The invention relates to a banding machine, more particularly a machine for consecutively forming bands and placing the bands around articles.

The banding machine of the invention can be used for forming the bands from a tubular member and putting the bands over any kind of articles. But the machine is especially designed to removably attach a flier, brochure or sheet of paper to the receptacle by means of the band. Typically, the flier, brochure or sheet of paper (hereafter generically referred to as "flier") contains information about the product in the receptacle. The receptacles, typically bottles, are therefore transferred to the banding machine after the receptacles are filled with the materials and are sealed by caps. After the fliers are attached by the banding machine, the receptacles are typically transferred to be boxed.

The banding machines are already known in the prior art, but the machines are insufficient in operation speed and reliability.

Accordingly, an object of the invention is to provide a banding machine, in which operation speed is high and the machine works smoothly and accurately.

Another object of the invention is to provide a banding machine, in which the machine is compact and economically manufactured.

Other objects and advantages of the invention are apparent from the following description of the invention.

SUMMARY OF THE INVENTION

In accordance with the invention, there is provided a banding machine for continuously forming bands and applying the bands over articles. The banding machine comprises means for arranging the articles into at least one row (preferably a plurality of rows), at least one supporting means (preferably a plurality of supporting means) for receiving the articles at forward ends of the arranging means and transferring the articles to a band receiving position, and means for supplying at least one tubular member (preferably a plurality of tubular members) from which the bands to be placed around the articles are formed. The banding machine includes at least one band fabricating and positioning means for continuously forming the bands from the respective tubular member and putting the bands around the articles held at the band receiving position by the supporting means. A plurality of band fabricating and positioning means are preferably included in the banding machine.

Each band fabricating and positioning means comprises feeding means for feeding the tubular member in increments of length corresponding to the width of the band to be fabricated, cutting means for cutting the tubular member to form the bands, and holding means for supporting the tubular member when the tubular member is cut and positioning the band around the article. The tubular members are situated above the band fabricating and positioning means and are fed to the feeding means of the band fabricating and positioning means.

The feeding means includes a cylindrical member, at least one first roller rotated periodically by power means, the first roller being located outside the cylindrical member, and at least one freely rotatable second roller provided around the outer periphery of the cylindrical member. A plurality of first and second rollers are preferred, with the rollers facing one other, and the wall of the tubular member passing between them. Accordingly, as the first rollers rotate, the tubular member between them is moved at a distance to define the width of the band.

The first rollers of each feeding means are preferably interconnected with the first rollers in the other feeding means so that all the rollers are rotated at the same time by the power means to move the respective tubular members.

The cutting means of each band fabricating and positioning means includes a hollow pulley through which the tubular member passes, a knife element, connecting means rotationally connecting the knife element and the pulley, and shifting means to shift the knife element between a cutting position and a non-cutting position. The pulley is rotatably connected to motor means. Preferably, the pulley of each band fabricating and positioning means is interconnected with the pulleys in the other band fabricating and positioning means by a belt. The shifting means is also connected to the shifting means in the other band fabricating and positioning means. The interconnected shifting means includes at least one shifting pneumatic cylinder to shift all the knife elements simultaneously between the cutting and non-cutting positions.

The holding means of each band fabricating and positioning means includes a pair of hollow semi-circular arms having at least one small opening, preferably a plurality of small openings inside the arms. Air is inspired through the small openings to retain the tubular member by vacuum force. The arms move laterally and vertically to intermittently apply the bands over the articles. Each arm of the holding means is respectively connected to the same side of the adjacent hollow arm in other band fabricating and positioning means to form two arm groups. The arm groups include a base rod having vertical lifting means to move the base rod up and down and two holding pneumatic cylinders. One of the holding pneumatic cylinders is situated between the two arm groups and the other is situated between one end of the connected arm groups and the base rod so that pairs of arm groups are moved apart and together all at the same time by the holding pneumatic cylinders. The arm groups further include a vacuum rod connected to the semicircular arms by means of flexible pipes for inspiration of air through the small openings.

The arm groups are moved to an upper position toward the tubular members, and air is inspired through the openings of the arms to hold the tubular members. Then the pulleys having the knives in the cutting position are rotated to cut the tubular members to thereby form the bands. The knives are then shifted to the non-cutting position by the shifting means, and the pulleys are further rotated. While the knives of the pulleys are in the non-cutting position, the first rollers of the feeding means rotate to move the tubular members downwardly by a distance corresponding to the width of the bands. Again, the knives are shifted to the cutting position to cut the tubular members and form the bands.

The bands cut by the knives and supported by the arms are moved downwardly to surround the articles. At this position, inspiration of air through the small openings of the arms is stopped to leave the bands around the articles. Then, the arm groups are moved apart and upwardly to the original position.

The arranging means of the banding machine includes at least one rotational table and at least one conveyor, preferably a plurality of conveyors. The rotational table receives the articles from a previous machine and distributes the articles to the conveyors. Each conveyor receives and arranges the articles in a row and transfers the articles to a front end of the conveyor. Each conveyor includes a pair of adjustable side walls to receive different sizes of articles and a stop at its front end to halt the article. Accordingly, the articles are retained on the conveyors. Each supporting means includes a pair of supporting rods situated on a body plate and a power device connected to the body plate. One of the supporting rods includes a holder at its front end which move laterally against the other rod to retain the articles between the supporting rod and the holder. All the supporting rods are situated on the common body plate to simultaneously transfer the articles to the band receiving position.

When the supporting means is retracted, the supporting rods receive the articles from the forward end of the conveyors. Namely, each movable supporting rod is moved toward the fixed supporting rod to retain the article by means of the holder and the rod. Then, the body plate is moved forwardly to transfer the articles to the band receiving position, where the bands are applied around the articles. Thereafter, the movable supporting rods are moved to release the articles, and the body plate is returned to the retracted position. The supporting means continuously operates to transfer the articles. When the supporting rods retaining the articles at the front end are moved from the retracted position to the band receiving position, the stops at the front end of the conveyors are pushed to allow the articles to pass through. The stops are immediately returned after the closest set of articles pass to thereby retain the next set of articles at the front end of the conveyors.

The banding machine of the invention further includes means for transmitting the articles to another machine after the bands are attached. Therefore, the transmitting means is located at the band receiving position, below the band fabricating and positioning means. The transmitting means receives the articles from the supporting means after the bands are formed and placed around the articles by the band fabricating and positioning means.

The banding machine of the invention is preferably used for attaching removable fliers around the articles by means of the bands. For that purpose, the banding machine further includes at least one means for feeding the fliers to the fabricating and positioning means (a plurality of such feeding means is preferred). Each means for feeding the fliers successively receives the fliers and then transmits the fliers alongside the articles held at the band receiving position by the supporting means. The band formed by the tubular member is applied over both the article and the flier while the flier is supported by the means.

The tubular member is preferably formed of a plastic material, and therefore, the band applied over the article is plastic. The banding machine includes at least one heating means, preferably a plurality of heating means, for attaching the plastic bands over the articles and the fliers. The heating means heat the plastic bands after the bands are applied over the articles and the fliers, to thereby pre-shrink the bands for retaining the fliers around the articles.

BRIEF DESCRIPTION OF THE DRAWINGS

FIG. 4 is an enlarged top plan view of a forward end of a conveyor in an arranging mechanism of the banding machine;

FIG. 5 is an enlarged top plan view of a bottle held by supporting means at a band receiving position of the banding machine;

FIG. 11 is a sectional view taken along line 11—11 in FIG. 10 illustrating a knife of the banding machine;

FIG. 13 is a bottom perspective view of a shifting plate for the knife attached to the pulley; and FIG. 14 is a broken perspective view of two pairs of arms for retaining the bands and applying the bands over the fliers and bottles.

DETAILED DESCRIPTION OF A PREFERRED EMBODIMENT

The following description is intended as a mere illustration of a preferred embodiment and is not intended to limit the scope of the present invention or of any other embodiments thereof.

Figure 1:
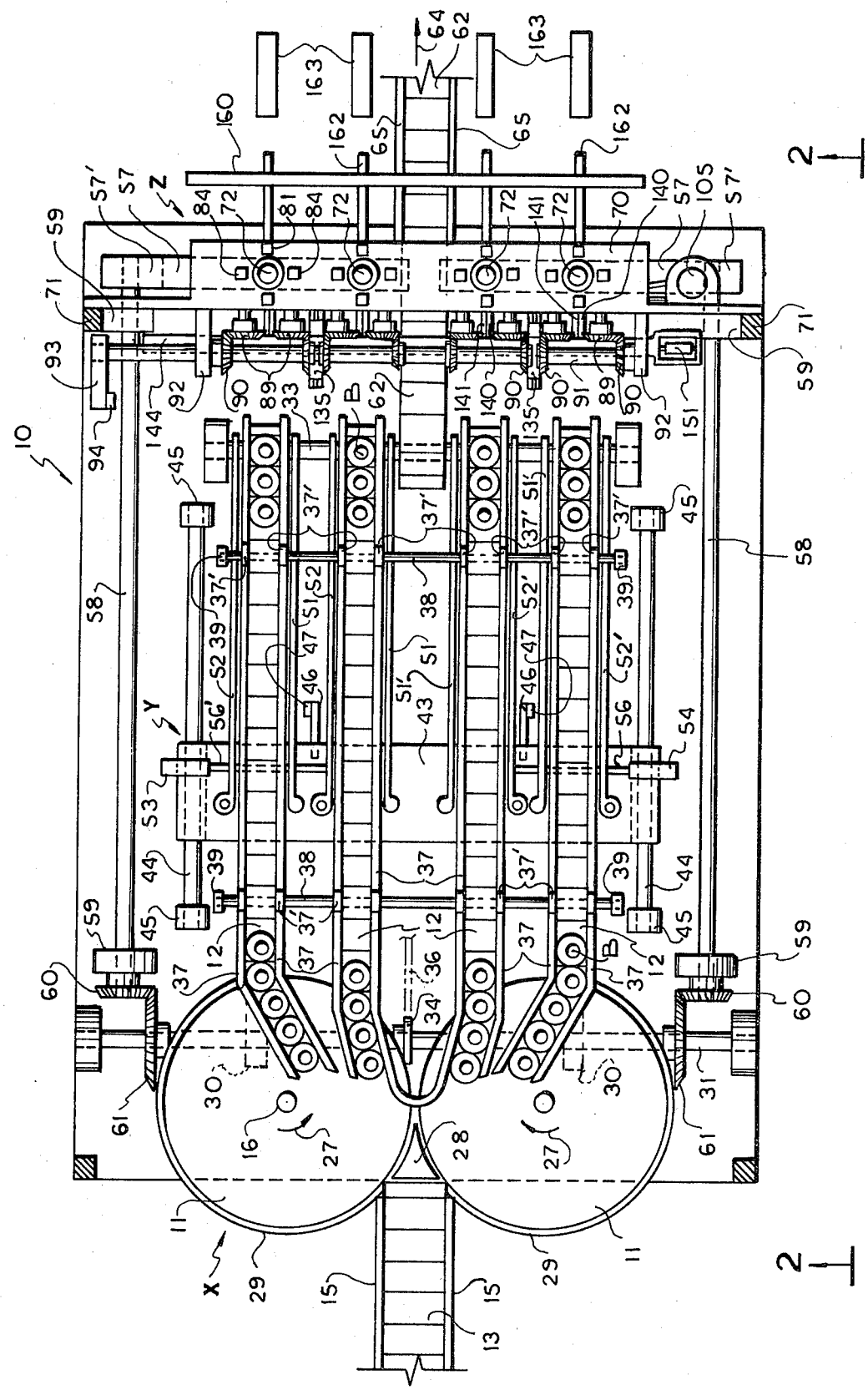
FIG. 1 is a top plan view of the banding machine in accordance with the present invention, in which tubular members are deleted to simplify illustration of the banding machine.
Figure 2:
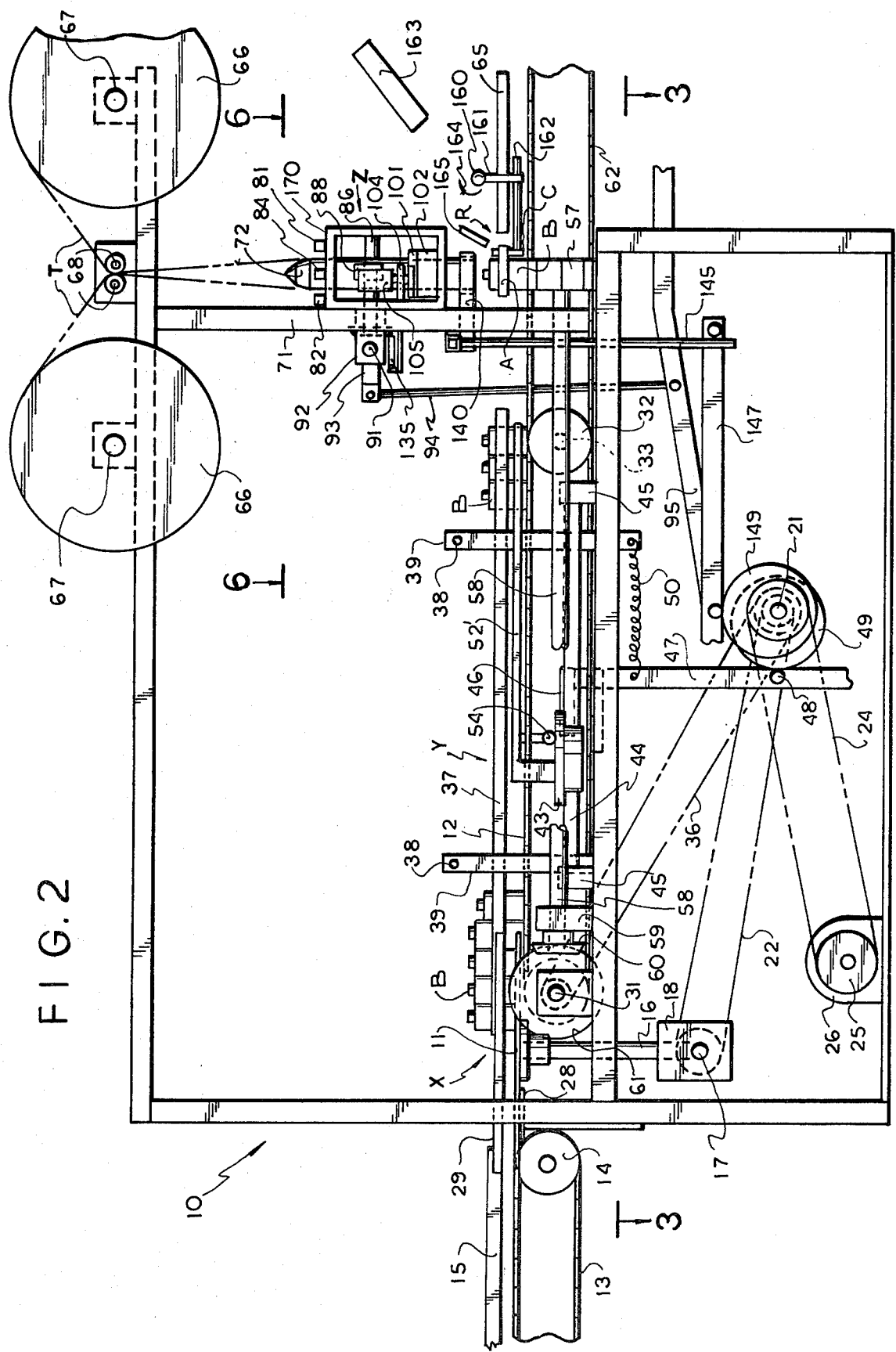
FIG. 2 is a side elevational view of the banding machine taken along line 2—2 in FIG. 1.

Referring to FIGS. 1 and 2, a banding machine 10 is illustrated in accordance with the present invention. The banding machine 10 in this embodiment is especially designed to apply bands A over bottles B for attaching fliers C to the bottles B. Before the bottles B are supplied to the banding machine 10, the bottles B are conventionally cleaned, filled with substance and closed with caps. After the bands A are applied over the bottles B by the banding machine 10, the bottles B may be transferred to another machine for further treatment or may be loaded into boxes.

The banding machine 10 of the invention is basically divided into three functional mechanisms, namely an arranging mechanism X, a supporting mechanism Y and a band fabricating and positioning mechanism Z. In the arranging mechanism X, the bottles B which have been transferred from a previous machine are arranged into four rows as illustrated in FIG. 1. The bottles B at the front end of each row are then transferred by the supporting mechanism Y to a band receiving position R. The bands A are formed of tubular members T in the fabricating and positioning mechanism Z, and are applied over the bottles B supported by the supporting mechanism Y. The fliers C are supplied alongside the bottles B before the bands A are applied to the bottles B.

The arranging mechanism X of the banding machine 10 comprises two turn tables 11 and four conveyors 12. The bottles B are transferred from a previous machine to the turn tables 11 by means of a conveyor belt 13 attached to a pulley 14. A pair of guide bars 15 are provided along the conveyor belt 13 for supporting the bottles B on the belt 13.

Each turn table 11 is rotatably supported by a shaft 16 connected to a horizontal shaft 17 by means of a gear box 18. The horizontal shaft 17 includes a sprocket 19 and is connected to a sprocket 20 of a main shaft 21 by means of a chain 22. The main shaft 21 is provided with a sprocket 23, and a chain 24 is situated between a sprocket 25 of a motor 26 and the sprocket 23 of the main shaft 21. Accordingly, when the motor 26 rotates, the main shaft 21 is driven to thereby rotate the turn tables 11 in the direction shown by arrows 27.

A support plate 28 is situated in an area surrounded by the turn tables 11 and the conveyor belt 13 for supporting the bottles B when they are transferred from the conveyor belt 13 to the turn tables 11. Guard rails 29 are respectively provided along edges of the turn tables 11.

Figure 3:
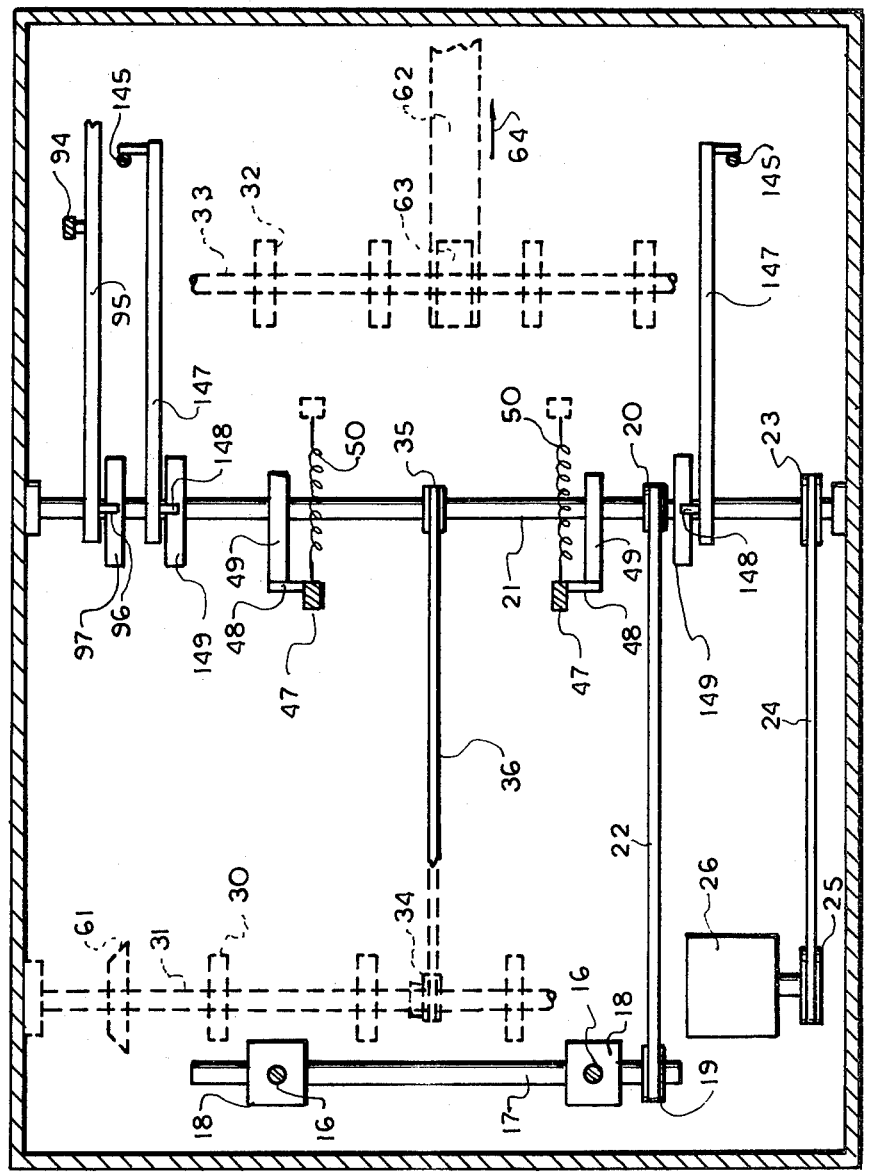
FIG. 3 is a sectional view of the banding machine taken along the line 3—3 in FIG. 2 for illustrating the power component of the machine.

Each conveyor 12 is situated between a pulley 30 on a shaft 31 and a pulley 32 on a shaft 33 (FIG. 3). The shaft 31 includes a sprocket 34, which is connected to a sprocket 35 on the main shaft 21 by means of a chain 36. Therefore, when the main shaft 21 is driven by the motor 26, the shaft 31 rotates as well to thereby move the conveyors 12.

A pair of guide bars 37 are provided along both sides of each conveyor 12 for supporting the bottles B on the conveyor 12. The guide bars 37 include cylindrical portions 37', which are adjustably situated on supporting rods 38 extending laterally across the conveyors 12 as illustrated in FIGS. 1 and 2, so that different size of the bottles B are arranged in a row between the bars 37. The supporting rods 38 are connected to a frame of the machine 10 by means of side plates 39. Each end of the guide bars 37 adjacent to the turn tables 11 is bent toward the end of the conveyor belt 13 in order to receive the bottles B from the turn tables 11. At the other end of the guide bars 37, a stop 40 is connected to one guide bar 37 of each pair of the guide bars 37 surrounding the conveyor 12 as illustrated in FIG. 4. The guide bar 37 includes a projection 41, to which the stopper 40 is rotatably fastened. A spring 42 is provided between the guide bar 37 and the stop 40, urging the stop inwardly over the conveyor 12 as illustrated.

Accordingly, the bottles B transferred by the conveyor belt 13 are distributed to the conveyors 12 by means of the turn tables 11 in the arranging mechanism X. The bottles B are then transmitted to the respective forward ends of the conveyors 12 where they are retained for banding.

The supporting mechanism Y includes a moving plate 43 reciprocatingly situated on a pair of rods 44, which are connected to the frame of the machine 10 by means of side plates 45. The moving plate 43 is provided with two projections 46 from which vertical rods 47 extend downwardly. Each vertical rod 47 includes a laterally extending roller 48, which contacts an eccentrically-situated side cam 49 on the main shaft 21. A spring 50 connects the vertical rod 47 and the frame at side plate 39 so that the rod 47 always contacts with the cam 49.

Accordingly, the moving plate 43 reciprocates along the rods 44 in accordance with rotation of the cam 49.

Fixed bars 51, 51', moving bars 52, 52' and two pneumatic cylinders 53, 54 are provided in the moving plate 43. The fixed bars 51, 51' are immovably attached to the moving plate 43, while the moving bars 52, 52' are rotatably connected to the plate 43. The moving bars 52, 52' include a holding projection 55 at each forward end to grasp the bottle B between the projection 55 and the fixed bar 51 or 51' (FIG. 5).

The pneumatic cylinders 53, 54 include piston rods 56, 56' respectively. The moving bars 52 are connected to the piston rod 56' of the pneumatic cylinders 53, and the moving bars 52' are connected to the piston rods 56 of the pneumatic cylinders 54, so that when the pneumatic cylinders 53, 54 are operated, the moving bars 52, 52' are actuated too.

When the moving plate 43 is in a retracted position as illustrated in FIGS. 1 and 2, the holding projections 55 are positioned at the forward ends of the conveyors 12. At this position, the pneumatic cylinders 53, 54 are operated to retain the bottles B located at the forward ends of the conveyors 12 between the projections 55 of the moving bars 52, 52' and the fixed bars 51, 51'. Then, the moving plAte 43 is moved forwardly until the bottles B are located at the band receiving position R. When the bottles B are moved forwardly, the stops 40 are opened by the forward movement of the bottles B and closed again by the springs 42 after the first set of bottles passes to thereby stop the next set of bottles B now positioned at the forward ends of the conveyors 12.

At the band receiving position R, the bottles B are supported by the bars 51, 51', 52, 52' until the fliers C are supplied to the bottles B, and the bands A are applied over the bottles B and the fliers C, followed by preshrinking. Then, the pistons 53, 54 operate to release the bottles B from the bars, and the moving plate 43 returns to the initial position.

Two conveyors 57 are provided below the bottles B at the band receiving position R to carry the bottles B inwardly after the fliers C and the bands A are attached to the bottles. Each conveyor 57 is situated between an outside pulley 57' on a shaft 58 and an inside pulley (not shown). The shaft 58 is supported by side plates 59 and includes a gear 60 at the end opposite the outside pulley 57'. The gear 60 is engaged with a gear 61 on the shaft 31, so that when the shaft 31 is driven as described before, the pulleys 57' are also rotated to thereby actuate the conveyor 57.

A conveyor 62 is situated perpendicular to the conveyors 57 between them. An end of the conveyor 62 is wound around a pulley 63 attached to the shaft 33 (FIG. 3). The shaft 33 is rotated by the conveyors 12, and the conveyor 62 is moved in the direction indicated by an arrow 64 in FIG. 3 to thereby transfer the banded bottles B from the conveyors 57 to the next machine. A pair of guide bars 65 are provided along the conveyor 62 to support the bottles between them.

On an upper portion of the banding machine 10, the tubular members T in the form of four rolls 66 are rotatably positioned around shafts 67. The rolls 66 are situated in staggered relationships, so that an individual roll 66 can be freely replaced without disturbing the other rolls 66. The tubular members T are vertically fed to the fabricating and positioning mechanism Z through directional rollers 68.

A rectangular hollow member 70 is situated between vertical frames 71 in the fabricating and positioning mechanism Z. The hollow member 70 includes four vertical openings through which each tubular member T extends downwardly. Cylindrical forms 72 are located in the respective vertical openings as illustrated. Each cylindrical form 72 includes several depressions on an outer surface (not shown) which engage other projections attached to the hollow member 70 (also not shown), so that the cylindrical form 72 is supported in the vertical openings. The cylindrical form 72 operates to unfold the flat tubular member T from the roll 66 into a substantially circular band (each tubular member T passes outside the cylindrical form 72).

Figure 6:
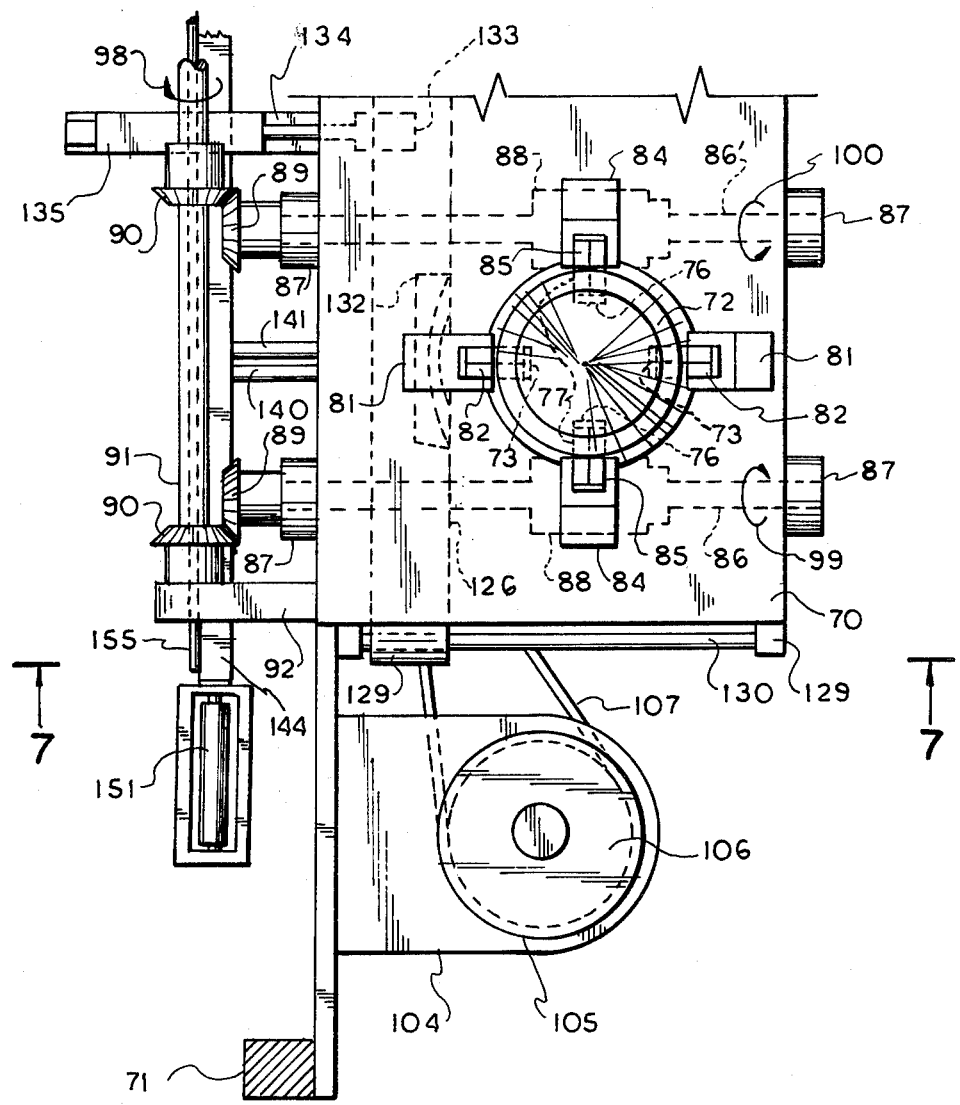
FIG. 6 is an enlarged top plan view of part of a fabricating and positioning means of the banding machine.
Figure 7:
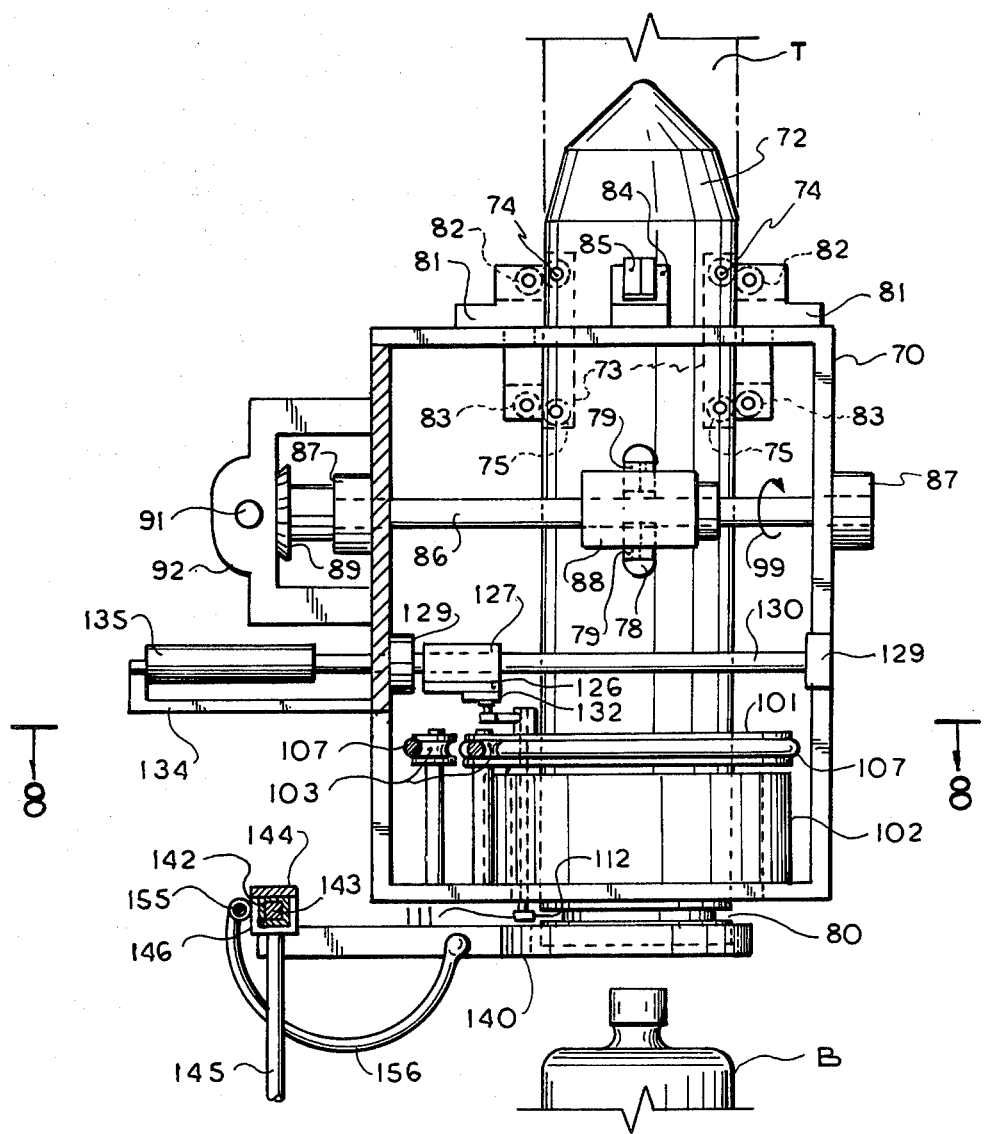
FIG. 7 is a sectional view taken along line 7—7 in FIG. 6.

As clearly shown in FIGS. 6 and 7, each cylindrical form 72 includes four setting members around its upper periphery, two setting members 73 parallel to the conveyor 12, each including upper and lower rollers 74, 75 and two setting members 76 perpendicular to the setting members 73, each including one roller 77. Below the setting members 76, two feeding members 78 are provided having two rollers 79 respectively, which operate to feed the tubular member T downwardly. The cylindrical form 72 includes a further depression 80 extending around the entire periphery near its lower end.

On the upper portion of the hollow member 70, four counter setting members are situated. Two counter setting members 81 include upper and lower rollers 82, 83 respectively which face and contact the rollers 74, 75 of the setting members 73, while the two other counter setting members 84 include one roller 85 which also faces and contacts the roller 77 of the setting member 76. The tubular member T passes between the rollers 74, 75, 77 of the setting members 73, 76 and the rollers 82, 83, 85 of the counter setting members 81, 84. The rollers are rotatably connected to the respective setting and counter setting members, so that as the tubular member T is pulled, it moves downwardly between the rollers.

Two shafts 86, 86' are provided perpendicular to the hollow member 70, which are located below the counter setting members 84 and outside the two feeding members 78. The shafts 86, 86' are situated between supports 87 that are connected to the hollow member 70. Each shaft 86, 86' includes a roller 88 which contacts the two rollers 79 of the feeding member 78, and a gear 89 engaged with a gear 90 situated on a shaft 91 extending substantially horizontally and parallel to the hollow member 70 as illustrated in FIGS. 6 and 7. The shaft 91 is upheld by supports 92 connected to the hollow member 70, and additionally includes a single-directional clutch 93 (FIG. 1, 2) operated by a vertical shaft 94. The shaft 94 is situated between the clutch 93 and an arm 95 having a roller 96 (FIG. 3). The roller 96 is located on a cam 97 on the main shaft 21 rotated by the motor 26. Accordingly, when the cam 97 is rotated, the arm 95 moves up and down to thereby move the shaft 94 up and down too. The clutch 93 receives up and down movement of the shaft 94 and operates to rotate the shaft 91. When the shaft 94 moves downwardly, the clutch 93 works to rotate the shaft 91 in the direction shown by an arrow 98 (FIG. 6). When the shaft 94 moves upwardly, the clutch 93 slips so that the shaft 91 does not rotate. Accordingly, the shaft 91 intermittently rotates due to rotation of the main shaft 21. It is to be noted that when the shaft 91 rotates in the direction as shown by the arrow 98, the shafts 86, 86' rotate in the direction shown by arrows 99, 100 in FIG. 6.

The tubular member T passing between the setting members and the counter setting members is situated between the rollers 79 of the feeding members 78 and the rollers 88. Therefore, when the shaft 91 rotates, the tubular member T is moved downwardly. The distance of the tubular member T moved by the rollers 88 constitutes the width of the band A to be inserted over the bottle B.

Figure 8:
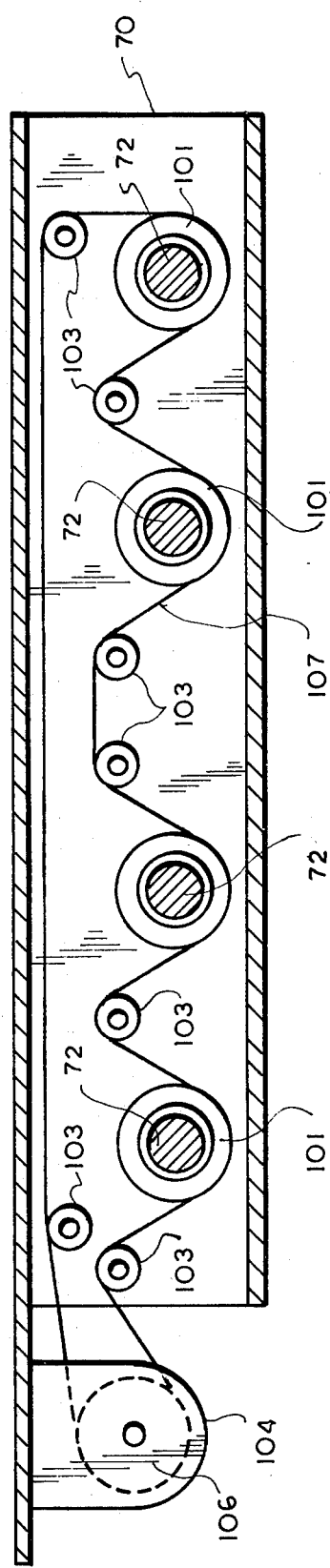
FIG. 8 is a sectional view taken along line 8—8 in FIG. 7 illustrating the power mechanism of the pulleys.

Inside the hollow member 70 (FIG. 8), four hollow pulleys 101 are provided, through which the respective cylindrical forms 72 further extend downwardly. Each pulley 101 is located on a guide 102 connected to the hollow member 70 so that the pulley 101 can be rotated. As clearly shown in FIG. 8, a plurality of guide pulleys 103 are situated on a bottom plate of the hollow member 70. Also, the hollow member 70 includes a horizontal plate 104, on which a motor 105 is located. A pulley 106 is connected to the motor 105 on an opposite side of the horizontal plate 104. An endless belt 107 is situated around the pulleys 101, 103, 106 as illustrated to thereby rotate the pulleys 101 around the cylindrical forms 72 with the motor 105.

Referring to FIGS. 9–12, each pulley 101 is provided with a base 108 connected to an upper surface of the pulley 101, and an opening 109 extending through the base 108 as well as through the pulley 101. A shaft 110 located in the opening 109 includes a holder 111 at its lower end having a knife 112 for cutting the tubular member T and a movable plate 113 tightly connected to its upper end as illustrated. The base 108 is provided with a hook 114 and a cylindrical projection 115 both upwardly extending therefrom. The movable plate 113 includes an upwardly-extending shifting rod 116, and downwardly-extending stop 117 and hook 118. The hook 118 is rotatably engaged in a hole 119 of a casing 120, and the hook 114 is also rotatably engaged in a hole 121 of a lid 122 having a bar 123. A compression spring 124 is located around the bar 123 and is inserted within the casing 120 when the lid and casing are assembled together. Accordingly, the base 108 and the plate 113 are rotatably engaged with respect to one another by means of the spring 124.

Figure 9:
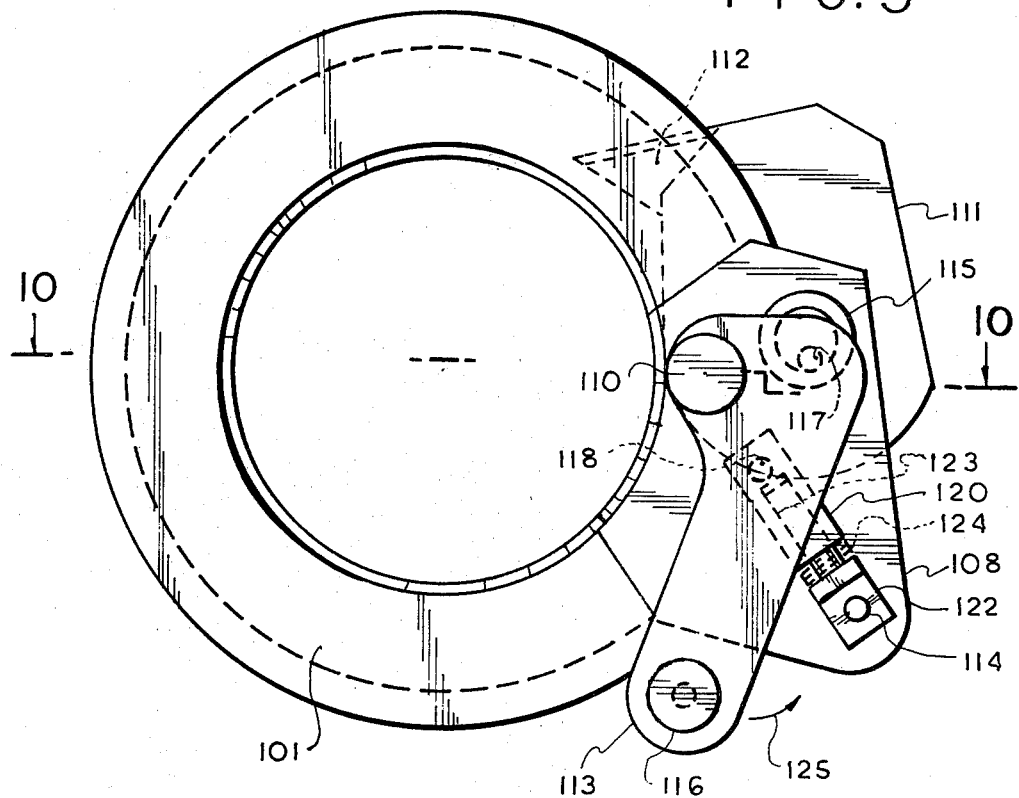
FIG. 9 is an enlarged sectional view of one of the pulleys shown in FIG. 8.
Figure 10:
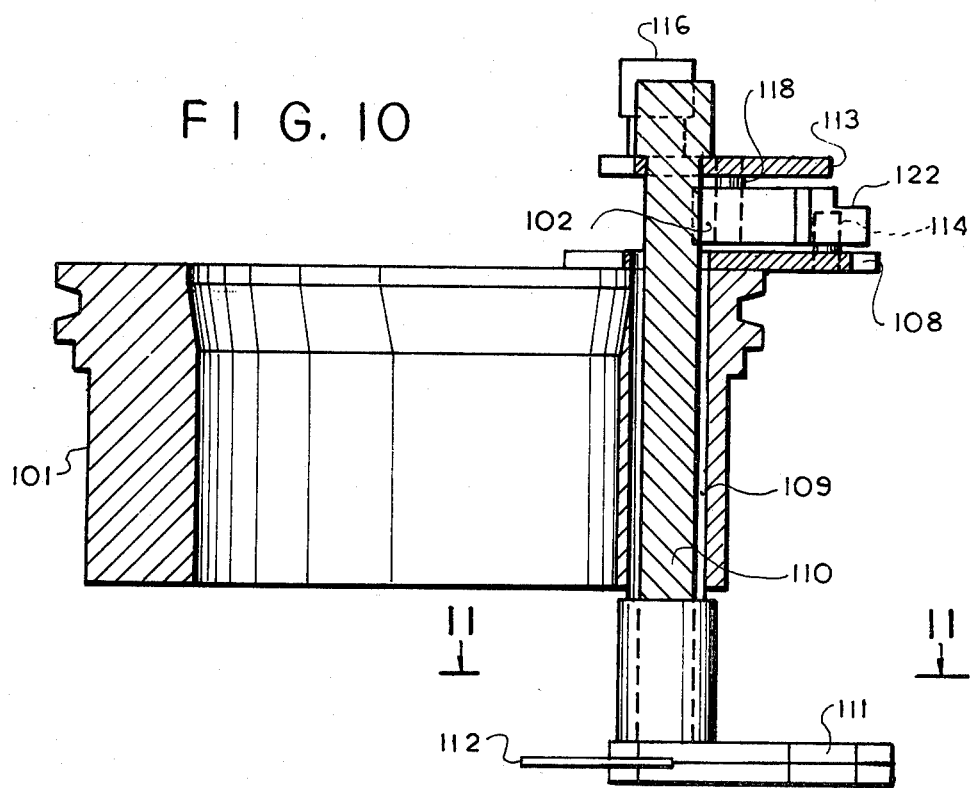
FIG. 10 is a sectional view taken along line 10—10 in FIG. 9.
Figure 12:
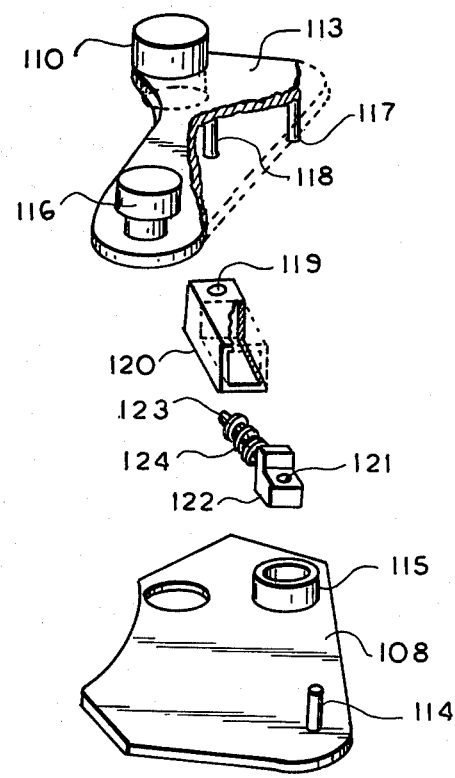
FIG. 12 is an exploded view of a switch mechanism for changing the orientation of the knife of FIG. 10 between cutting and non-cutting positions.

In FIG. 9, the knife 112 is in a non-cutting position. However, when the plate 113 is rotated as indicated by an arrow 125 to a cutting position, the compression spring 124 is at first compressed and then expanded, with the stop 117 moving to a position in the projection 115 opposite the position shown in FIG. 9. Namely, the cutting and non-cutting positions are located at opposite sides of the projection 115, with the center of projection 115 the position at which the spring 124 is most compressed. Accordingly, the knife 112 is stably located either in the cutting position or the non-cutting position as long as the plate 113 is not shifted. As illustrated in FIG. 7, each knife 112 is located just adjacent to the depression 80 of the lower end of cylindrical form 72. When the knife 112 is adjusted to the cutting position, a front edge of the knife 112 extends into the depression 80, so that when the pulley 101 is rotated, the tubular member T is cut to form the band A.

A shifting plate 126 is provided above the pulleys 101 to extend along the hollow member 70 for shifting the knives 112 attached to the pulleys 101 between the cutting and non-cutting positions, as illustrated in FIGS. 6, 7 and 13. The shifting plate 126 includes supporting plates 127 at both longitudinal ends having holes 128 respectively. Also, the hollow member 70 includes two pairs of side plates 129 at longitudinal ends to respectively support rods 130 between them. The rods 130 extend through the holes 128 of the plate 126 so that the plate 126 can be freely moved along the rods 130. The shifting plate 126 is provided with four pairs of inner and outer shifting blocks 131, 132 beneath the plate 126, and two blocks 133 on top of the plate 126 (only one block 133 is illustrated in FIG. 13). A pair of support plates 134 are connected to the hollow member 70, and two pneumatic cylinders 135 are situated between the support plates 134 and the blocks 133. Accordingly, when the pneumatic cylinders 135 operate, the shifting plate 126 moves forth and back.

The shifting plate 126 is located above the pulleys 101 so that when the pulleys 101 rotate, the shifting rods 116 connected to the pulleys 101 move along paths 136 defined between the shifting blocks 131, 132 illustrated in FIG. 13. Each path 136 has wide inlet 137 for receiving the top of the shifting rod 116 wherever the shifting plate 126 might be located. For example, should the knife 112 be in the non-cutting position, and the shifting plate 126 is then moved forwardly, the shifting rod 116 will come in contact with an inner surface of the shifting block 132 due to rotation of the pulley 101, so that the shifting rod 116 is moved as indicated by the arrow 125 in FIG. 9 to the cutting position. If the shifting plate 126 is then moved rearwardly, then the shifting rod 116 will enter into the inlet 137 of the path 136, and come in contact with the inner surface of the block 131 to be returned to the non-cutting position. It should be noted that the pulleys 101 are always rotated by the motor 105, and the knives 112 attached to the pulleys 101 are shifted to the cutting position and the non-cutting position in a single rotation of the pulleys 101.

Referring to FIGS. 7 and 14, a pair of semi-circular arms 140, 141 are situated around the lower end of each cylindrical form 72 for retaining the tubular members T while being formed into bands A, and then applying the bands A over the bottles B. The arms 140 of each pair are connected to an outer rod 142 and the arms 141 are connected to an inner rod 143. Above the outer rod 142, a base rod 144 is provided which is connected to two vertical rods 145 by means of U-shaped members 146. The vertical rods 145 are supported by the frame (not shown) and are connected to bars 147 respectively (see FIGS. 2 and 3). Each bar 147 includes a roller 148 at a forward end which is located on a cam 149 connected to the main shaft 21. The cams 149 are eccentrically situated on the main shaft 21, so that when the cams 149 are rotated due to rotation of the main shaft 21, the bars 147 move up and down thereby reciprocating the vertical rods 145.

The base rod 144 is connected to the outer rod 142 by means of a pneumatic cylinder 150, and the outer rod 142 is then connected to the inner rod 143 by means of a pneumatic cylinder 151 on the opposite side of the pneumatic cylinder 150 as illustrated in FIG. 14. The inner rod 143 is entirely situated within the outer rod 142, and the outer rod 142 includes four rectangular openings 152 in its bottom, through which the arms 141 are connected to the inner rod 143 by bolts (not shown). The arms 140, 141 include air passages 153 therein and a plurality of small holes 154 communicating with the air passages 153 and the outside. The passages 153 are connected to an air pipe 155 through flexible tubes 156. The pipe 155 is supported by the outer rod 142 and is connected to a vacuum pump (not shown) for suction of air, so that air is inspired through the small holes 154 to thereby retain the tubular member T around the inner surface of the arms 140, 141.

When the pneumatic cylinder 150 is operated for expansion, the outer and inner rods 142, 143 move as indicated by an arrow 157 in FIG. 14 together with the arms 140, 141. But, when the pneumatic cylinder 150 is operated for expansion as stated above, the pneumatic cylinder 151 is designed to expand twice as much as pneumatic cylinder 150 to thereby move the inner rod 143 and the connected arms 141 in the direction as indicated by an arrown 158. Accordingly, when the pneumatic cylinders 150, 151 function together, each pair of arms 140, 141 will appear to be symmetrically opened and closed.

The arms 140, 141 are initially located at an upper position as illustrated in FIG. 7 and are then moved closer together. At this position, air is inspired through the small holes 154 so that the lower ends of the tubular members T are retained by the respective pair of the arms 140, 141. Then, the pulleys 101 with knives 112 in the cutting position are rotated to form bands A from the tubular members T. The base rod 144 is lowered down by means of the cams 149, and therefore, the bands A supported by suction in the pair of arms 140, 141 are applied around the bottles B. Inspiration of air through the small holes 154 is then ceased and the arms are expanded or opened to release the bands A. Thereafter, the base rod 144 is lifted up to the first position, the arms are moved closer together, and air is inspired to retain the next set of tubular members T once again.

Soon after the tubular members T are cut by the knives 112, the knives 112 are moved to the non-cutting position by the plate 126. During the next single rotation of the pulleys 101 the rollers 88 are rotated to advance the tubular members T downwardly, so that the lower ends of the tubular members T are again moved to the lower position of the cutting mechanism. The arms 140, 141 are returned to the initial positions after applying the bands A to the bottles B to, again retain the tubular members T, and the knives 112 are then shifted to the cutting position by the plate 126 to cut and form the bands A. Therefore, the bands A are continuously formed and applied around the bottles B.

As previously described, the bottles B, which are grasped by the bars 51, 52, 51', 52' at the forward ends of the conveyors 12, are transferred to the band receiving position R by the supporting mechanism Y just before the fliers C are supplied against the bottles B. After the bands A are applied over both the fliers C and the bottles B followed by preshrinking, the bars 52, 52' actuate to release the bottles B and place them onto the conveyors 57. Then, the bottles B are transferred to the next machine, The supporting mechanism Y returns to the initial position to grasp the next set of bottles B and supply them once again to the band receiving position R.

Flier supply means, already known in the art, will be briefly explained in view of FIGS. 1 and 2. The supply means includes a rotational rod 160 connected to a motor (not shown), four rods 161 perpendicularly connected to the rotation rod 160, and four supply rods 162 perpendicularly attached to the rods 161 respectively as illustrated. Each rod 162 contains an air passage (not shown) extending through its entire length which is connected to a vacuum pump (not shown). The fliers C are placed in casings 163 having openings (not shown) in the front ends. The casings 163 are positioned so that when the rotation rod 160 is rotated in the direction as shown by an arrow 164, the supply rods 162 come in contact with the front openings of the casing 163. When the fliers C are supplied to the bottles B, air is inspired through the air passages of the rods 162 in this extended position, so that the front fliers C in the respective casings 163 are retained on the ends of the rods 162. Then, the rod 160 is rotated to return to the first position indicated in FIG. 2. Soon after the fliers C are located near the bottles B, the bands A are applied over both the fliers C and the bottles B. Then, hot air is blown on to the bands A through pipes 165 for preshrinking the bands A to thereby attach the flier C to the bottles B. At this time, inspiration of air through the air passage in rod 162 is halted and the rods 162 are rotated to receive the next set of fliers C from the casings 163. The bottles B are released from the supporting mechanism Y and are transferred by the conveyors 57, 62 to the next processing step or machine.

What is claimed is:

1. A machine for continuously forming and applying bands on articles, comprising:

means for arranging the articles into at least one row;

at least one means for receiving the articles from the arranging means and transferring the articles to a band receiving position;

means for supplying at least one tubular member to be fabricated into a band; and at least one means for continuously fabricating the bands from the tubular member and positioning the bands on the articles at the band receiving position, said fabricating and positioning means including, means for feeding the tubular member in increments corresponding to the width of the band to be fabricated, said feeding means having a substantially cylindrical member with the tubular member passing around the cylindrical member; at least one first roller outside both of the cylindrical and tubular members and rotatable by first power means; and at least one rotatable second roller on the surface of the cylindrical member opposite said first roller so that when the first roller rotates, the tubular member between the first and second rollers is impelled at a distance equivalent to the width of a band;

means for cutting the tubular member to fabricate the band, said cutting means having a hollow pulley rotatable by second power means through which the tubular member passes; a knife; means for rotatably connecting the knife and the hollow pulley; and means to shift the knife between a cutting position and a non-cutting position; and means for retaining the tubular member as it is cut into a band, and positioning the band on an article, said connecting means including a movable plate; a shaft extending through the hollow pulley with an upper end connected to the movable plate and a lower end connected to the knife; a rod attached to the movable plate for shifting orientation of the movable plate; and a spring positioned between the pulley and the movable plate for urging the movable plate between cutting and non-cutting positions.

2. A machine according to claim 1 comprising a plurality of fabricating and positioning means, wherein the first roller on the cylindrical member is interconnected with the first rollers on the cylindrical members in other fabricating and positioning means so that all the first rollers are rotated at the same time by the single first power means.

3. A machine according to claim 1, wherein the feeding means additionally comprises:

at least one additional pair of rotatable rollers above the first and second rollers, one roller of said pair being located on the outer surface of the cylindrical member and the other roller of said pair being located outside both the tubular and cylindrical members, with the tubular member passing in between the pair of rollers, so that the tubular member is smoothly shaped into a curved form.

4. A machine according to claim 1, wherein the connecting means further comprises:

a base plate attached to the hollow pulley;

a rotatable casing and a lid connected to the movable plate and to the base plate respectively with said spring positioned within the casing and lid; and a stop on the movable plate and a stop on the base plate to restrain movement of the movable plate beyond cutting and non-cutting positions.

5. A machine according to claim 4, wherein the shifting means comprises:

an inner wall and an outer wall, both adapted to selectively engage the shifting rod of the connecting means; and a pneumatic cylinder for actuating the shifting means;

so that the shifting rod will contact at least one of the inner and the outer wall of the shifting means and shift the movable plate of the connecting means which in turn will rotate the shaft of the connecting means and adjust the knife between the cutting and non-cutting positions.

6. A machine according to claim 1, wherein the retaining means comprises;

a pair of hollow semicircular arms disposed in a substantially circular arrangement and adapted to move both laterally and vertically, each arm containing at least one opening on the inside surface thereof;

so that air can be inspired through the opening to catch and retain the tubular member by vacuum force.

7. A machine according to claim 6, wherein a plurality of said fabricating and positioning means is provided, each side of each pair of hollow arms being interconnected with the same side of the other pairs to form two sets of interconnected side arms.

8. A machine according to claim 7, wherein said retaining means additionally comprises:

a base rod with vertical lifting means;

a first shifting cylinder operatively connected to the two sets of side arms to move the arms of each pair toward or away from each other;

a second shifting cylinder operatively connected to one of the two sets of side arms to simultaneously laterally move both arms of each pair; and a vacuum rod connected to one of the side arms for inspiration of air through the air openings.

9. A machine according to claim 1, wherein the arranging means comprises:

at least one rotatable table for receiving the articles; and at least one conveyor for receiving the articles from the rotable table, arranging the articles in an orderly row, and transferring the articles to a forward end thereof.

10. A machine according to claim 9, wherein the conveyor is provided with a pair of adjustable side walls to receive and support different sizes of articles; and a stop to retain the article at the forward end of the conveyor.

11. A machine according to claim 1, wherein said receiving and transporting means comprises:

a body plate, a pair of supporting rods situated on the body plate, at least one of said supporting rods having a holding projection at a forward end thereof and being moved relative to the other supporting rod to retain the article between the supporting rods, and a third power means connected to the body plate to transfer the articles from the forward end of the arranging means to the band receiving position.

12. A machine according to claim 11 comprising a plurality of supporting means, wherein all the supporting rods of the receiving and transferring means are connected to the common body plate to transfer a set of articles to the band receiving position at the same time.

13. A machine according to claim 12, further comprising:

means for receiving the articles from the receiving and transferring means at the band receiving position after the bands are formed and secured on the articles by the fabricating and positioning means and transferring the banded articles to another subsequent machine.

14. A machine according to claim 1, additionally comprising:

at least one means for supplying a flier against the article held at the band receiving position by the receiving and transferring means, so that the band formed from the tubular member is secured over both the article and the flier.

15. A machine according to claim 14, wherein the tubular member is manufactured from plastic material.

16. A machine according to claim 15, additionally comprising:

at least one means for supplying heat to the plastic bands secured over both the articles and the fliers, to preshrink the bands for retaining the fliers around the articles.

* * * * *